Nov. 28, 1950 M. HYMAN, JR., ET AL Re. 23,297
SHEETLIKE LIGHT-POLARIZING COMPLEX OF IODINE AND A POLYVINYL COMPOUND WITH PROTECTIVE SURFACE BORIC ACID-POLYVINYL COMPOUND COMPLEX
Original Filed Feb. 8, 1945
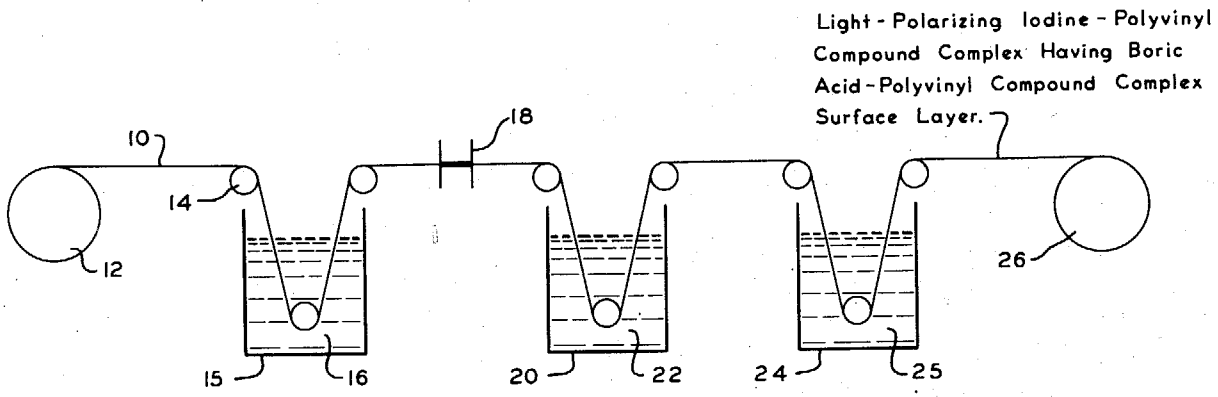
INVENTORS
Mark Hyman, Jr.
BY Cutler D. West
Donald L. Brown
Attorney Reissued Nov. 28, 1950

Re. 23,297

UNITED STATES PATENT OFFICE 23,297

SHEETLIKE LIGHT-POLARIZING COMPLEX OF IODINE AND A POLYVINYL COMPOUND WITH PROTECTIVE SURFACE BORIC ACID-POLYVINYL COMPOUND COMPLEX

Mark Hyman, Jr., Belmont, and Cutler D. West, Cambridge, Mass., assignors to Polaroid Corporation, Cambridge, Mass., a corporation of Delaware Original No. 2,445,579, dated July 20, 1948, Serial No. 576,850, filed February 8, 1945. Application for reissue filed September 14, 1948, Serial No. 49,164

9 Claims. (Cl. 88—65)

Matter enclosed in heavy brackets [ ] appears in the original patent but forms no part of this reissue specification; matter printed in italics indicates the additions made by reissue This invention relates to a new and improved light-polarizing material. This application is a continuation-in-part of our copending application Serial No. 499,238, filed August 19, 1943, for Light polarizer and process of manufacture, but now abandoned.

It is one object of the present invention to provide substantially improved light-polarizing sheets or films of the type described in Patent No. 2,237,567, issued April 8, 1941, to Edwin H. Land.

Another object of the invention is to provide an improved light-polarizing material of the type shown in said patent and comprising a sheet or film of a molecularly oriented polyvinyl oxy compound, such as polyvinyl alcohol or a suitable cyclic ether of polyvinyl alcohol, having incorporated therewith a dichroic substance such as one comprising iodine and having on one or both surfaces an integrally formed protective layer comprising the product of esterification of the material of said sheet with a polybasic acid or a polybasic acid derivative.

A further object is to provide an improved light-polarizing sheet material of the above type wherein said protective surface layer comprises a cross-linked ester of polyvinyl alcohol, to provide such a sheet wherein said layer comprises a cross-linked polyvinyl alcohol ester of a polybasic acid or a derivative of such an acid and particularly an inorganic polybasic acid, and to provide such a sheet wherein said layer comprises a polyvinyl borate.

A still further object is to provide an improved light-polarizing material as outlined above wherein the material comprising said protective layers extends throughout the body of said sheet or film.

Additional objects and advantages will in part appear and in part be pointed out in the course of the following description of one or more embodiments of the invention, which are given as non-limiting examples, in connection with the accompanying drawing, which is a diagrammatic view illustrating an arrangement of apparatus suitable for use in the practice of the invention.

Patent No. 2,237,567 discloses the production of a light-polarizing material in sheet form in a variety of ways, including the application of a solution of iodine or a dichroic dye to a sheet of polyvinyl alcohol and at some time during said process stretching said sheet to orient the molecules therein. In accordance with the present invention, it has been discovered that light-polarizing material of greatly improved stability, not only against heat but also against moisture and ultra-violet radiation, may be produced by providing said sheets with an integrally formed surface layer comprising the product of esterification of the material of said sheets with a polybasic acid, such for example as boric acid, or with a suitable polybasic acid derivative.

In carrying out one embodiment of the invention, a sheet of the desired plastic material, such for example as polyvinyl alcohol or a suitable polyvinyl alcohol derivative or mixed linear polymer containing polyvinyl alcohol, may first be stretched to orient the molecules therein. The degree of stretch may vary considerably, depending upon the purpose to which the sheet is to be put, and generally speaking, a stretch of four or five times is quite satisfactory. It has also been found advantageous to follow the stretching operation with a baking treatment, as for example by heating the sheet at approximately 145° C. for 10 to 15 minutes. It should, however, be understood that these steps are subject to wide variation without in any way departing from the essentials of the invention.

The stretched and baked sheet may then be treated in any of a variety of ways to incorporate therein a dichroic substance such as a dichroic dye or other dichroic stain. An example of a highly suitable dichroic substance is a dichroic stain comprising iodine, and in the drawing, sheet 10 is illustrated as passing from supply roll 12 over idler rolls 14 through tank 15 containing a relatively strong iodine solution 16. The composition of solution 16 may be varied considerably, but it should preferably have a relatively high ratio of iodide to iodine, and illustrative examples of satisfactory solutions will be given hereinafter. The time of treatment with solution 16 will depend both upon the composition of said solution and the desired density of stain to be obtained.

After sheet 10 has been stained, it should preferably be at least partially dried, as for example by passing through wiper elements 18 to remove the surplus iodine solution from the surfaces thereof. The next step of the process of the invention is to treat the sheet with the desired esterifying agent. This may conveniently be done by passing sheet 10 into a second tank 20 containing a solution 22 of said agent, and in accordance with this embodiment of the invention particularly satisfactory results have been obtained with a concentrated solution of boric acid. The time of treatment is not critical. It appears that the reaction is substantially complete in less than one minute, and in general from 30 to 45 seconds will be ample. Preferably this step will be followed by a washing step for the purpose o' removing the surplus acid solution from the surface of the sheet and preventing precipitation as it dries. Thus in the drawing, sheet 10 is shown as passing from tank 20 into a third tank 24 containing a washing solution 25, which may comprise either water or a suitable non-solvent of polyvinyl alcohol, such for example as acetone. The washing step should preferably be relatively brief, i. e., of the order of five to ten seconds, since prolonged contact of the treated sheet with water may result in hydrolysis and dissolving of the boric acid from sheet 10. After the washing step, the sheet should be dried in any desirable way, as for example by wiping, prolonged exposure to the air, or moderate heating, before passing to take-up roll 26.

It appears that the result of the above outlined process is to convert a minute layer adjacent the surface of sheet 10 into the reaction product of polyvinyl alcohol and the reagent used in solution 22, and the properties of said product indicate that it is a cross-linked ester of polyvinyl alcohol. Thus in the example given above, the finished sheet 10 will be found to have an integral surface layer comprising a polyvinyl alcohol ester of boric acid, i. e., a polyvinyl borate, *and more specifically, polyvinyl orthoborate,* which is highly unreactive to heat and other forces affecting the stability of the iodine stain within the sheet. It is resistant to water, although on prolonged exposure thereto it will tend to hydrolyze, and it is substantially impervious to water vapor and also appears to seal the iodine in the body of the sheet in the same way that it seals out moisture. Said layer is so integral a part of the sheet that it is substantially inseparable therefrom. Its thickness, particularly with relation to the total thickness of the sheet, depends upon the length of time the reaction is permitted to run and also on the initial thickness of the sheet. Since as noted the formation of the reaction product on the surface of the sheet tends to slow penetration of the body of the sheet by the reagent, in a relatively thick sheet the esterified layer tends to remain thin in relation to the total thickness of the sheet. In a very thin sheet, however, the reaction may go to substantial completion to give, in the above example, a dichroic sheet of polyvinyl borate.

It is believed that the reaction by which the protective layer of the invention is formed in the above example involves the condensation of each of the hydroxyl groups in the boric acid with a hydroxyl group of the polyvinyl alcohol to form water, and that the boron atoms then serve to cross-link adjacent carbon chains of the polyvinyl alcohol through the remaining oxygen atoms. This reaction may be accompanied by some decrease in the degree of molecular orientation of the reacted layer. When, for example, the dichroic substance in the sheet comprises iodine, this in turn may cause a loss in the transmission of the sheet running as high as from 5% to 10% of incident light, and the predominant color of the sheet also changes towards the blue. This decrease in transmission may in some cases be desirable, particularly for the production of light-polarizing material of high polarizing efficiency but relatively low transmission. If desired, however, this result may be prevented by modifying the above outlined process as described below.

As has already been mentioned, the above described esterification process of the invention primarily affects the surface of sheet 10, and it appears that the borate or other cross-linked product formed during the process tends to prevent further penetration of the sheet by the acid solution. The darkening result above mentioned may accordingly be prevented by eliminating the iodine from so much of the surface layers of the sheet as will be penetrated by the acid solution. One way of accomplishing this result is to wash sheet 10 with water after treatment in solution 16 but before treatment in solution 22. The time for this washing treatment depends primarily upon the hardness of the sheet and may vary, for example, from 10 to 30 seconds. A simple way of determining the proper time is first to test portions of the sheet by washing for different periods followed by treatment in solution 22. When the latter step does not cause darkening or bluing of the sheet, it has been sufficiently washed. Following this washing step, the sheet may be dried if desired, but this step is not necessary, and the sheet may be passed directly into solution 22.

Alternatively to the above step of washing the sheet with water, it may be washed instead with a stronger solvent for iodine, such for example as a solution of gelatin in water. The concentration of said solution may be relatively dilute, and satisfactory results have been obtained with approximately .5 gram of gelatin in 100 cc. of water. Other solvents for iodine may be used, such for example as methanol, and the time of this washing treatment will depend to a considerable extent on the degree of solubility of iodine in the washing solution used. For example, treatment with methanol for as little as one second will generally be found satisfactory, and the sheet may then be passed directly into the acid solution either with or without preliminary drying.

When the product of the invention is produced by any of the above washing steps, preferred results will be obtained if the initial staining of the sheet brings about a somewhat more dense color than is desired in the finished product, since said washing step causes removal of a part of the stain. The composition of solution 16 is in part determined by whether the washing step will be with water or with a stronger solvent for iodine, although in any case said solution should have a relatively high proportion of iodide to iodine. Examples of satisfactory ranges are as follows, although it is to be understood that they are given solely for illustrative purposes and not in any way as limitations of the invention.

| | | |
|---|---|---|
| Iodine | grams | 5 |
| Ammonium iodide | do | 10–50 |
| Water | cc. | 50–200 |

It should be noted that the use of iodine solutions as strong as the above examples may tend to produce a yellowish tinge in the sheet treated therewith, but this tendency may also be overcome by suitable control of the washing step of the invention. That is to say, if the washing step be stopped just prior to the removal of sufficient surface stain to prevent any bluing by acid solution 22, the slight bluish tinge produced by said acid solution will be found to neutralize the yellowish tinge in the sheet without appreciably lowering the percentage of incident light transmitted thereby. Other variations and modifications of this example of the invention will doubtless be apparent to those skilled in the art, and are to be construed as coming within the scope thereof.

The present invention is not limited to use with polyvinyl alcohol and may be practiced with other linear polyvinyl oxy compounds, that is to say, compounds whose molecules contain the grouping $$\left[\begin{array}{c}-CH_2-CH-\\ \quad\quad\;\; | \\ \quad\quad\;\; O-\end{array}\right]_n$$

and particularly with mixed polymers and other derivatives of polyvinyl alcohol such as the acetals and ketals. The term "polyvinyl oxy compound" as used herein and in the claims is to be understood as being limited to compounds containing the above atomic structure, and the term "acetals and ketals of polyvinyl alcohol" is to be understood as generic to the class of resins formed from polyvinyl acetate by the successive or combined steps of hydrolysis and condensation with aldehydes and ketones respectively. It should be pointed out, however, that when the invention is practiced with mixed polymers or derivatives of polyvinyl alcohol, only incomplete derivatives should be used, that is to say, some of the hydroxyl groups of the polyvinyl alcohol should remain unreacted in order to enter into the subsequent esterification reaction.

*It should be noted that the invention is not limited to the use of dichroic substances comprising iodine and that other dichroic materials may be employed, such particularly as the dichroic dyes and other stains disclosed in the above-mentioned Land patent and its related Patent No. 2,328,219, issued August 31, 1943.*

Boric acid is a preferred material for use in the practice of the present invention, for a variety of reasons. Its reaction product with polyvinyl alcohol is particularly suitable for the purposes of the invention, for the reasons already discussed. The reaction goes very easily at room temperature using only water as solvent, and it is easily controlled to any desired degree of completion. Of particular importance is the fact that neither the reaction itself nor the conditions of reaction affect the polarizing properties of the sheet, except for the above mentioned darkening effect the ready control of which is also described. On the other hand, comparable results may also be obtained with derivatives such as boron halides capable of esterifying an alcohol. In the latter case it will be apparent that the by-product of the reaction will be a halogen acid instead of water.

In the production of the improved light-polarizing sheets of the present invention, the step of molecular orientation of the sheet, and preferably also the step of incorporating the iodine or other dichroic substance therein, should preferably be carried out before treatment with the acid solution. The surface coating of the products of the invention has little extensibility when dry and tends to crack and thus be rendered useless if the steps of the process are carried out in different order. On the other hand, the extensibility of the acid-treated sheet increases if the sheet is swelled with a suitable solvent or swelling agent, and a useful degree of molecular orientation can be obtained by stretching such sheets when swelled. Comparable results may be obtained by casting boric acid or a similar agent in a sheet of the desired plastic and then swelling and stretching the sheet. It will be apparent that this provides an alternative method for forming a substantially uniform sheet of the cross-linked material, *i. e., one in which the boron content will be substantially uniform,* and said sheet may be made light-polarizing by the incorporation of a suitable dichroic substance therein, for example by staining with iodine as explained above in connection with the drawing. These and similar modifications will doubtless be apparent to those skilled in the art and are to be construed as coming within the scope of the invention.

Since certain modifications in the product which embody the invention may be made without departing from its scope, it is intended that all matter contained in the above description or shown in the accompanying drawing shall be interpreted as illustrative and not in a limiting sense.

What is claimed is:

1. A light-polarizing sheet comprising a molecularly oriented linear polyvinyl compound selected from the group consisting of polyvinyl alcohol, the polyvinyl acetals and the polyvinyl ketals, said sheet having an oriented dichroic sorption complex of said polyvinyl compound and iodine incorporated therein, and a complex of boric acid and said polyvinyl compound present on at least one surface of the sheet in a predetermined concentration and extending from said surface into the sheet in a progressively attenuated concentration, said boric acid-polyvinyl compound complex forming a layer which is heat and moisture resistant, whereby the said iodine-polyvinyl compound complex is protected from heat and moisture.

2. A light-polarizing sheet comprising a molecularly oriented linear polyvinyl alcohol, said sheet having an oriented dichroic polyvinyl alcohol-iodine-sorption complex incorporated therein, and a polyvinyl alcohol-boric acid complex present on at least one surface of the sheet in a predetermined concentration and extending from said surface into the sheet in a progressively attenuated concentration and forming a layer which is heat and moisture resistant, whereby the said polyvinyl alcohol-iodine sorption complex is protected from heat and moisture.

3. A light-polarizing sheet comprising a molecularly oriented linear polyvinyl butyral, said sheet having an oriented dichroic polyvinyl butyral-iodine-sorption complex incorporated therein, and a polyvinyl butyral-boric acid complex present on at least one surface of the sheet in a predetermined concentration and extending from said surface into the sheet in a progressively attenuated concentration and forming a layer which is heat and moisture resistant, whereby the said polyvinyl butyral-iodine sorption complex is protected from heat and moisture.

4. A light-polarizing sheet comprising a molecularly oriented linear polyvinyl compound selected from the group consisting of polyvinyl alcohol, the polyvinyl acetals and the polyvinyl ketals, said sheet having an oriented dichroic sorption complex of iodine and said polyvinyl compound incorporated therein and a complex of boric acid and said polyvinyl compound present on each surface of the sheet in a predetermined concentration, and forming layers which extend from each said surface into the sheet in progressively attenuated concentration and which are heat and moisture resistant, whereby the said iodine-polyvinyl compound complex is protected from heat and moisture.

5. A thin light polarizing sheet comprising a molecularly oriented linear polyvinyl compound selected from the group consisting of polyvinyl alcohol, the polyvinyl acetals and the polyvinyl ketals, said sheet having an oriented dichroic sorption complex of iodine and said polyvinyl compound incorporated therein, said sheet also having incorporated therein and adjacent each surface thereof in predetermined concentration a complex of said polyvinyl compound and boric acid which is heat and moisture resistant, said polyvinyl compound-boric acid complex forming a layer adjacent each surface of said sheet and extending from each said surface into said sheet, whereby the said iodine-polyvinyl compound complex is protected from heat and moisture.

*6. A light-polarizing, molecularly oriented film of a heat and moisture resistant polyvinyl orthoborate having a dichroic stain incorporated therein, said polyvinyl orthoborate being a substantially complete reaction product of boron ions and a polyvinyl compound from the class consisting of polyvinyl alcohol, the polyvinyl acetals and the polyvinyl ketals, the boron content of the polyvinyl orthoborate resulting from the reaction of said polyvinyl compound with a concentrated solution of boric acid until said reaction is substantially complete.*

*7. A light polarizer as set forth in claim 6 in which said stain comprises iodine.*

*8. A light-polarizing sheet comprising a molecularly oriented linear polyvinyl compound selected from the group consisting of polyvinyl alcohol, the polyvinyl acetals, and the polyvinyl ketals, said sheet having an oriented dichroic stain incorporated therein, said sheet comprising adjacent at least one of the surfaces thereof a layer of a heat and moisture-resistant polyvinyl orthoborate, the boron content of the polyvinyl orthoborate being that of a substantially complete reaction product of boron ions and the said polyvinyl compound produced by the imbibition of a sheet of the said polyvinyl compound in a concentrated solution of boric acid until the reaction is substantially complete, said sheet comprising adjacent said layer other layers of*

*polyvinyl orthoborate containing progressively less boron in a direction from said surface layer toward the center of said sheet.*

*9. A light-polarizing sheet comprising a molecularly oriented linear polyvinyl compound selected from the group consisting of polyvinyl alcohol, the polyvinyl acetals, and the polyvinyl ketals, said sheet having an oriented dichroic stain incorporated therein, said sheet comprising adjacent at least one of the surfaces thereof a layer of a heat and moisture-resistant polyvinyl orthoborate, the boron content of the polyvinyl orthoborate being that of a substantially complete reaction product of boron ions and the said polyvinyl compound produced by the imbibition of a sheet of the said polyvinyl compound in a concentrated solution of boric acid until the reaction is substantially complete.*

MARK HYMAN, JR.
CUTLER D. WEST.

REFERENCES CITED

The following references are of record in the file of this patent or the original patent:

UNITED STATES PATENTS

| Number | Name | Date |
|---|---|---|
| 2,072,302 | Hermann | Mar. 2, 1937 |
| 2,072,303 | Hermann et al. | Mar. 2, 1937 |
| 2,125,374 | Herrman et al. | Aug. 2, 1938 |
| 2,237,567 | Land | Apr. 8, 1941 |
| 2,255,940 | Rogers | Sept. 16, 1941 |
| 2,300,074 | Strain | Oct. 27, 1942 |
| 2,312,913 | Kirby | Mar. 2, 1943 |
| 2,322,210 | Muskat et al. | June 22, 1943 |
| 2,326,539 | Irany | Aug. 10, 1943 |
| 2,327,872 | Dahle | Aug. 24, 1943 |
| 2,344,117 | Nierling et al. | Mar. 14, 1944 |
| 2,360,477 | Dahle | Oct. 17, 1944 |
| 2,375,963 | Thomas | May 15, 1945 |

FOREIGN PATENTS

| Number | Country | Date |
|---|---|---|
| 382,785 | Great Britain | Nov. 3, 1932 |